(12) United States Patent
Picht et al.

(10) Patent No.: US 9,305,066 B2
(45) Date of Patent: Apr. 5, 2016

(54) SYSTEM AND METHOD FOR REMOTE DATA HARMONIZATION

(71) Applicants: Michael Picht, Walldorf (DE); Gebhard Roos, Walldorf (DE); Hannes Keil, Hamburg (DE)

(72) Inventors: Michael Picht, Walldorf (DE); Gebhard Roos, Walldorf (DE); Hannes Keil, Hamburg (DE)

(73) Assignee: SAP SE, Walldorf (DE)

( * ) Notice: Subject to any disclaimer, the term of this patent is extended or adjusted under 35 U.S.C. 154(b) by 196 days.

(21) Appl. No.: 13/893,066

(22) Filed: May 13, 2013

(65) Prior Publication Data

US 2014/0337382 A1    Nov. 13, 2014

(51) Int. Cl.
G06F 7/00 (2006.01)
G06F 17/00 (2006.01)
G06F 17/30 (2006.01)

(52) U.S. Cl.
CPC .............................. *G06F 17/30548* (2013.01)

(58) Field of Classification Search
CPC .......... G06F 17/30289; G06F 11/2094; G06F 17/30548; G06F 17/30575
See application file for complete search history.

(56) References Cited

U.S. PATENT DOCUMENTS

| | | | |
|---|---|---|---|
| 7,165,078 B2 | 1/2007 | Lang et al. | |
| 7,236,973 B2 | 6/2007 | Kalthoff et al. | |
| 7,490,052 B2 | 2/2009 | Kilger et al. | |
| 7,756,822 B2 | 7/2010 | Danner et al. | |
| 8,032,573 B2 | 10/2011 | Richard | |
| 8,180,732 B2 | 5/2012 | Krabel et al. | |
| 8,306,845 B2 | 11/2012 | D'Imporzano et al. | |
| 8,316,237 B1* | 11/2012 | Felsher et al. | 713/171 |
| 8,370,233 B2 | 2/2013 | Kaisermayr et al. | |
| 8,589,208 B2 | 11/2013 | Kruger et al. | |
| 2007/0260545 A1 | 11/2007 | Bade et al. | |
| 2007/0282713 A1* | 12/2007 | Ullman et al. | 705/27 |
| 2009/0089078 A1* | 4/2009 | Bursey | 705/1 |
| 2009/0099852 A1 | 4/2009 | Ouimet | |
| 2011/0047072 A1 | 2/2011 | Ciurea | |
| 2011/0307295 A1 | 12/2011 | Steiert et al. | |
| 2012/0150792 A1 | 6/2012 | Yassin et al. | |
| 2014/0032259 A1 | 1/2014 | Lafever et al. | |
| 2014/0310243 A1* | 10/2014 | McGee et al. | 707/639 |

* cited by examiner

*Primary Examiner* — Susan Chen
(74) *Attorney, Agent, or Firm* — Schwegman Lundberg & Woessner, P.A.

(57) ABSTRACT

In an example embodiment, a demand signal management system is configured to coordinate data harmonization among a plurality of entities. The demand signal management system may obtain unharmonized data through third party entities. Global records based on internal master records and taxonomy information may be distributed to the entities. In some embodiments certain entities may have authority to create new global records. In other embodiments, some entities may have authority to approve proposed new global records. In still other embodiments, some entities may not have authority to create new global records. Unharmonzied data sent to the entities for harmonization in accordance with the global records. The entities may accept or reject the harmonization request. If accepted, the entity may return an updated global record, a proposed new global record, and/or a new global record depending on the unharmonized data, the global records and the entities' authority.

19 Claims, 10 Drawing Sheets

SYSTEM AND METHOD FOR REMOTE DATA HARMONIZATION

TECHNICAL FIELD

This disclosure relates to data harmonization. More particularly, this disclosure relates to coordinating multiple systems and entities to harmonize data.

BACKGROUND

Manufactures and other entities may use data from multiple sources to identify customer demand, adjust product plans, plan marketing campaigns, adjust product manufacture, order products, etc. In one example, a manufacturer may collect point of sale data, sales order data, product demand data, and other data from a wide variety of sources and use that data for reporting, analytics and other purposes. Data from disparate sources often is not in the same format, have the same fields, or may even be conflicting.

BRIEF SUMMARY

According to one aspect of the present disclosure a demand signal management system may coordinate data harmonization among entities. The demand signal management system may send global records having a plurality of attributes to entities to use as the basis for harmonization. Unharmonized data may be obtained by the demand signal management system. The system may send a harmonization request message to an entity identifying the unharmonized data and receive in response a message that may have an updated global record, a new global record, a proposed new global record or a rejection message.

In some embodiments, when a rejection is received, a new request may be sent to a different entity to harmonize the data.

DETAILED DESCRIPTION

The description that follows includes illustrative systems, methods, techniques, instruction sequences, and computing machine program products of illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

The disclosure herein is broad enough to apply to an entity such as a product, a customer or a product/customer combination. Thus, although the general description is often described in terms of a product, the embodiments herein may apply to any like entity (e.g., customer, product/customer combination).

Manufacturers increasingly rely on data representing real world phenomena and articles to optimize their operations and manufacturing. By way of example, data representing real world phenomena and articles may include point of sale (POS) data, sales orders, product demand, sales forecasts, competitor data, market research data, and/or other data. However, collecting all this information and making it usable can be a daunting task. Differences in the format of data, the attributes of the data (e.g., fields such as product ID, location of sale, quantity, etc.) and so forth can make it difficult for a business to utilize the data. A demand signal management system may collect, validate, harmonize, enrich the data and/or otherwise prepare it for use. These can be daunting tasks and often an entity may wish to partner with others to accomplish one or more of them.

As used in this disclosure, harmonizing data means to take data in one format with attribute values and convert the data into format and attribute values used internal to an entity. This may include, for example, such tasks as converting external IDs to internal IDs, converting externally used quantity measures to internally used quantity measures, converting external descriptions to internal descriptions, and so forth. By way of example, and not limitation, converting external IDs to internal IDs may include converting an external product ID to an internal product ID, converting an external location code to an internal location code, converting an external vendor ID to an internal vendor ID and so forth.

Figure 1:
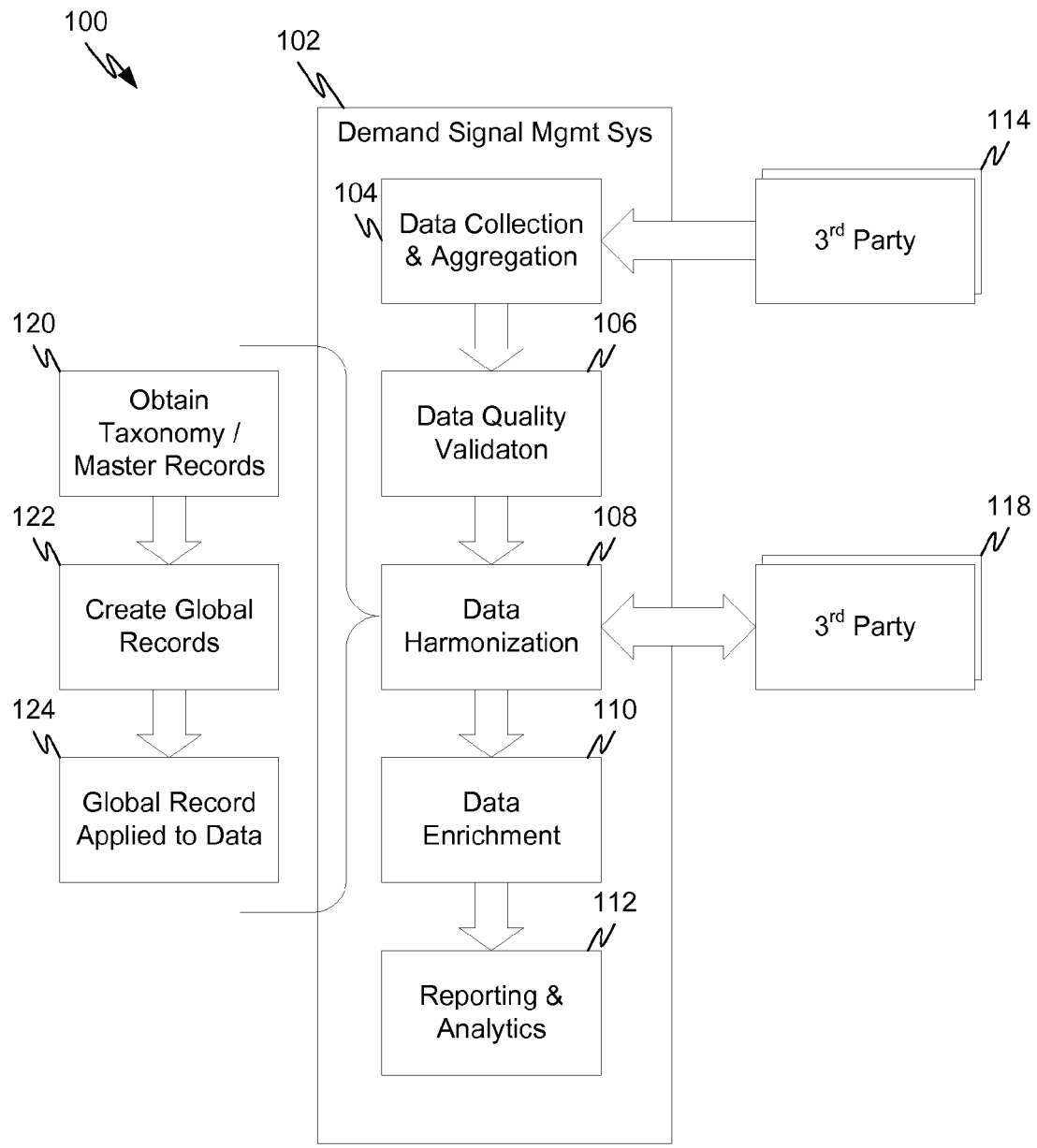
FIG. 1 illustrates an example embodiment of a demand signal management environment.

FIG. 1 illustrates an example embodiment of a demand signal management environment. The environment, shown generally as 100, comprises a demand signal management system 102 designed to coordinate activities among a variety of entities, systems or parties, such as third parties 114, 116, and 118. Demand signal management system 102 may comprise a variety of modules that work together to provide the desired functionality. In the example embodiment of FIG. 1, Demand signal management system 102 may comprise data collection and aggregation component 104, data quality validation component 106, data harmonization component 108, data enrichment component 110 and/or reporting and analysis component 112. The components illustrated in FIG. 1 may be representative of a sample progression that takes data and prepares it for use.

Data collection and aggregation component 104 represents collecting the desired data and, if necessary, aggregating data from multiple sources together. As previously discussed, such data may comprise point of sale (POS) data, sales orders, product demand, sales forecasts, competitor data, market research data, and/or other data. In some embodiments, the desired data may be collected by the demand signal management system 102. In some embodiments, the data may be collected for the demand signal management system 102 by another internal system. In other embodiments, the desire data may be collected by one or more entities and provided to the demand signal management system 102. In still other embodiments, a combination of internally collected data and externally collected data is used. Third parties 114 represent the collection and/or aggregation of data by external entities. At this point, the collected and aggregated data is unharmonized.

Data quality validation component 106 performs any quality and/or validation checks on the data and/or coordinates others in this task. Often, collected data may be incomplete or otherwise have quality issues that need to be resolved before the data can be used. For example, sometimes attributes may be missing or may need to be created from the values of other attributes. When attributes are missing, the attributes may be be filled in, if the information may be recovered, the data may be used for some purposes but not for others, and/or the data point may be discarded as unreliable. Other validation tasks may be needed before the data is accepted. Sometimes validation is referred to as technical cleansing.

Data harmonization component 108 harmonizes the data or coordinates others in this task. As mentioned above, harmonizing data means to take data in one format with attribute values and convert the data into format and attribute values used internal to an entity. This may include, for example, such tasks as converting external IDs to internal IDs, converting externally used quantity measures to internally used quantity measures, converting external descriptions to internal descriptions, and so forth. By way of example, and not limitation, converting external IDs to internal IDs may include converting an external product ID to an internal product ID, converting an external location code to an internal location code, converting an external vendor ID to an internal vendor ID and so forth. Components 120, 122, and 124 represent a conceptual mechanism for accomplishing this task.

Component 120 obtains any taxonomy and master records that will be used to create the global records used in harmonization. A taxonomy is a schema that represents the attributes of records, along with their values, that should be used in harmonization. An example taxonomy may include a company ID, product IDs associated with the company ID, quantity units associated with the product IDs, etc. The taxonomy may come from outside the company, such as being provided by a third party (or multiple third parties), or may come from inside the company, and/or a combination of both. Master records are records pulled internally from other systems that should be used in deriving the global records for harmonization. Master records may include, for example, current distributors of a product, along with the products they sell, etc. A schema may also be associated with, or extracted from, this information.

Component 122 combines the taxonomy and master records into global records that will be used to harmonize the data. Global records reflect both the taxonomy and the master records and represent a combined schema, including supported field values that should be used to harmonize the data. Due to the various sources that may be used to obtain the taxonomy and master records, various entities, both inside and outside, may have responsibility over changes in their respective taxonomies. As taxonomies or master records change, the global records may be changed to reflect the taxonomy/master records change. Similarly, if changes need to be made to the global records, such changes may be sent to the owner of the respective taxonomy and/or master record for approval and the change incorporated into the taxonomy/master record.

Component 124 represents the actual harmonization itself. The process of harmonization applies the global record to the data. This may include such tasks as substituting internal IDs for the equivalent existing external IDs (product, company, manufacturer, location, etc.), converting externally used quantity units to internally used quantity units, making any needed format changes, etc. The resultant harmonized data is in the format and has the equivalent field values used internally and may be added to a data repository for further use.

Demand signal management system 102 may also coordinate both internal and external resources to accomplish this task. Third parties 118 represent external resources and/or entities used by the system 102 to accomplish some or all of these tasks. As discussed below, the system 102 may partition the tasks to accomplish harmonization in a variety of ways and coordinate everything to harmonize collected data.

As indicated by the arrows connecting third parties 114, 116 and 118, third parties may be used to do multiple of the tasks and they may pass data and other information between them without going through demand signal management system 102 in some embodiments.

Data enrichment component 110 represents enrichment to the data that may be performed by the demand signal management system 102. Enrichment may comprise such tasks as combining sets of data to allow more insight to be gained. An example may be where sales data is enriched with event data (e.g., major events that occurred over the same period) to allow correlations and conclusions to be drawn and predictions to be made. Other transformations may be made to the data in this component, such as categorization, profiling and/or clustering.

Reporting and analytics component 112 represents any reporting and analytics capability built into demand signal management system 102. In some embodiments, data from any of the components (e.g., data harmonization block 108, data enrichment block 110) may be provided to other systems for functions such as reporting, analytics, forecasting, etc.

Figure 2:
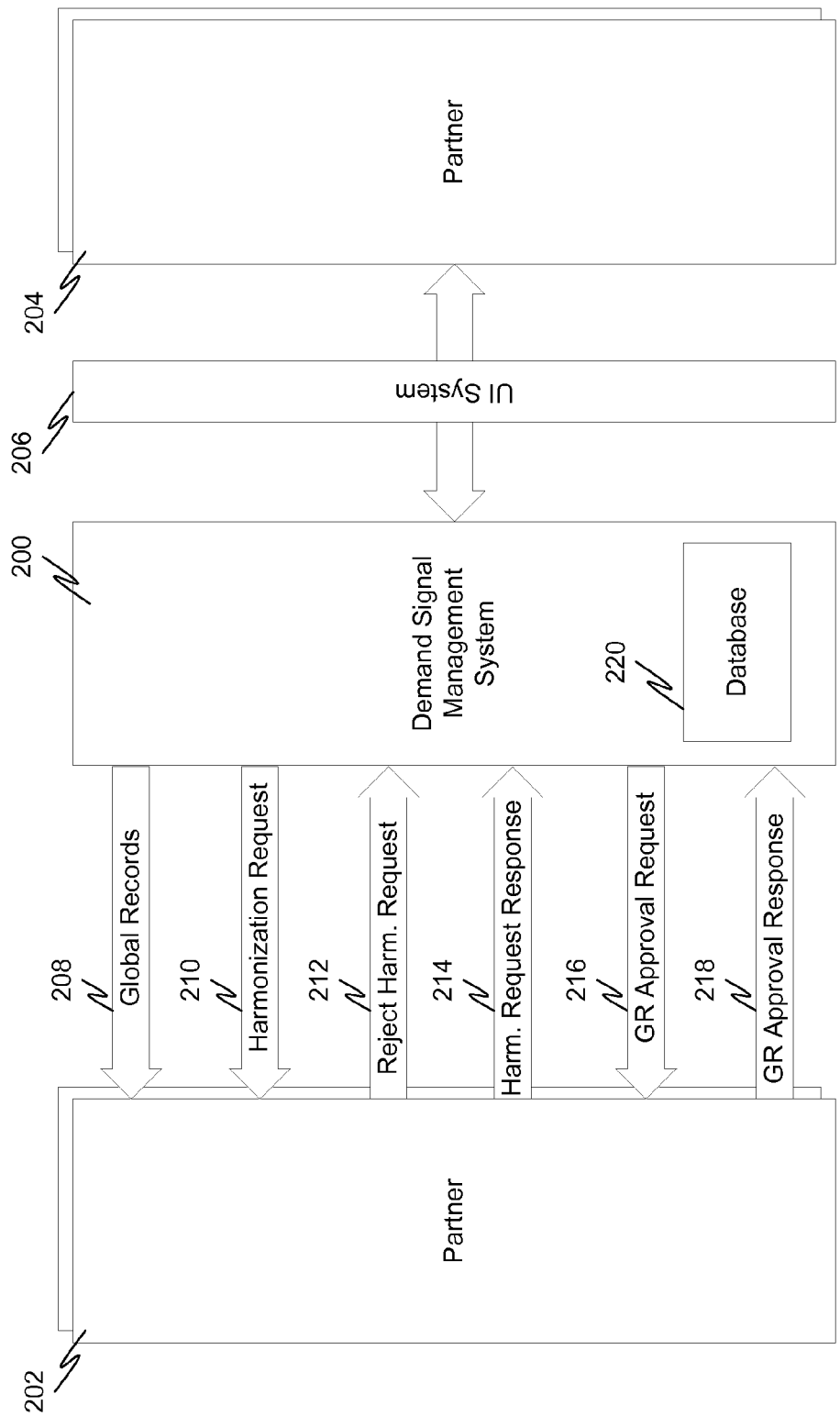
FIG. 2 illustrates an example embodiment of a system to coordinate partners for data harmonization.

FIG. 2 illustrates an example embodiment of a system to coordinate partners for data harmonization. In FIG. 2, demand signal management system 200 may coordinate with partners 202 and/or 204 in several modes. In one embodiment, demand signal management system 200 coordinates partners 202 through services/messages to perform harmonization. In another embodiment, demand signal management system 200 provides a UI by which partners 204 may remotely access information residing on demand signal management system 200 to harmonize data. In yet another embodiment, a combination of these two approaches is used. In this discussion, partners 202 and partners 204 may represent external entities coordinated by demand signal management system 200. Thus, they may represent an examples of the third parties 118 of FIG. 1.

Demand signal management system 200 may comprise a database 220 to store a repository for harmonized data and other related information and functions. Database 220 may be an in-memory database, a conventional database, or some combination of the two.

An example embodiment provides a UI by which partners 204 may remotely access information residing on demand signal management system 200 to harmonize data. In such an embodiment, a system, such as UI system 206, provides the interface. UI system 206 may reside outside the corporate firewall so as to minimize risk of a security breach. The UI system 206 may provide various UI screens that allow users, such as partners 204, to access data and other functionality provided by demand signal management system 200. UI system 206 may then, in turn, access the functionality provided by demand signal management system 200 through remote procedure calls, or similar functionality to access the desired information. Note that UI system 206 may also provide web services or other mechanisms that would allow a system at partner 204 to access functionality of demand signal management system 200.

By way of example, and not limitation, UI system 206 may allow partner 204 to access global records used to harmonize data. UI system 206 may also allow partner 204 to access unharmonized data residing within the corporate firewall and present the data to partner 204 for harmonization. The harmonized data may also be stored within the corporate firewall in a harmonization repository.

Embodiments of demand signal management system 200 may also implement a work assignment/workflow and present the work assignment/workflow using UI system 206. For example, demand signal management system 200 may examine unharmonized data and select a partner (partner 204, for example) for harmonization of a set of unharmonized data. When partner 204 accesses demand signal management system 200 through UI system 206, partner 204 may be notified of the selection. Partner 204 may then accept or reject the selection. If partner 204 rejects the selection, demand signal management system 200 may select another partner. If partner 204 accepts the selection, partner 204 may harmonize the data through UI system 206.

Some partners may have authority to create new global records. If partner 204 is such a partner, then as partner 204 harmonizes the data, partner 204 may create new global records through UI system 206. A new global record may also include new global attribute names and values. Demand signal management system 200 may then use the newly created global records in future data harmonization. Additionally, if the creation of a new global record represents a change in a taxonomy and/or master record, demand signal management system 200 may forward the change to the taxonomy and/or master record owner. Partners that have the authority to create new global records may have the authority to approve global records proposed by others (and make appropriate corrections to proposed records) as well as create/approve/correct global attribute names and values. A partner may the authority to create new global records in one part of the global records but not in another part. Thus, approval authority is not a binary thing (e.g., either you have it or don't), but functions more like access privileges in a hierarchical database, where a partner may have authority to create records in one part of the database and not in another.

Some partners may not have the authority to create new global records. If partner 204 is such a partner, then as partner 204 harmonizes the data, partner 204 may create new proposed global records through UI system 206. A proposed global record may also include proposed global attribute names and values. Demand signal management system 200 may then forward the new proposed global records to an approver. The approver may approve a proposed global record, or may modify the proposed global record in some way. In the latter situation, the modified record is used by demand signal management system 200 for harmonization. Approval forwarding, approving proposed global records, and modification of proposed global records may all be done through UI system 206.

Another example embodiment uses messages and services to coordinate with partners to perform harmonization. In such an embodiment, demand management system 200 may implement a work assignment/workflow and present the work assignment/workflow using messages or other communication devices. For example, demand signal management system 200 may distribute global records to partners to use in data harmonization. In FIG. 2, global records message 208 represents this distribution. Depending on the size of data and the message structure, global records message 208 may contain all global records, an update to a previous global records message, or an identifier/location where partner 202 may access or retrieve global records for data harmonization. In some embodiments, not all partners receive all global records. Data harmonization typically requires business knowledge and/or industry expertise. Thus, a system that deals with a wide variety of industries and/or products may choose to segment data harmonization by partner expertise. In such an embodiment, partners may only receive global records corresponding to the area for which they will be asked to harmonize data.

Demand signal management system 200 may examine unharmonized data and select a partner 202 for harmonization of a set of unharmonized data. Upon selection, demand signal management system 200 may notify partner 202 through harmonization request message 210. Harmonization request message 210 may identify the data set to be harmonized, either by including the data set to be harmonized or by including an identifier/location where the data set may be accessed/retrieved.

After receiving harmonization request message 210, partner 202 may accept or reject the selection. If partner 202 rejects the selection, partner 204 may notify demand signal management system 200 by sending reject harmonization request message 212. Upon receipt of the message, demand signal management system 200 may select another partner and send out a harmonization request message to that partner.

If partner 202 accepts the selection, partner 202 may harmonize the data using the global records it has previously received. Once harmonization is complete, partner 202 may send harmonization request response message 214 to demand signal management system 200. Harmonization request response message 214 may comprise an update to an existing global record, a new global record, and/or a new proposed global record, depending on the embodiment and the authority of partner 202.

If partner 202 has authority to create new global records, then as partner 202 harmonizes the data, partner 202 may create new global records, if needed and send the new global record as part of the harmonization request response message 214. A new global record may also include new global attribute names and values. Demand signal management system 200 may use the newly created global records in future data harmonization and distribute the newly created global records to appropriate partners. Additionally, if the creation of a new global record represents a change in a taxonomy and/or master record, demand signal management system 200 may forward the change to the taxonomy and/or master record owner. Partners that have the authority to create new global records may have the authority to approve global records proposed by others (and make appropriate corrections to proposed records) as well as create/approve/correct global attribute names and values. A partner may the authority to create new global records in one part of the global records but not in another part. Thus, approval authority is not a binary thing (e.g., either you have it or don't), but functions more like access privileges in a hierarchical database, where a partner may have authority to create records in one part of the database and not in another.

If partner 202 does not have the authority to create new global records, then as partner 202 harmonizes the data, partner 202 may create new proposed global records, if needed and send the new global record as part of the harmonization request response message 214. A proposed global record may also include proposed global attribute names and values. Demand signal management system 200 may then forward the new proposed global records to an approver. The approver may approve a proposed global record, or may modify the proposed global record in some way. In the latter situation, the modified record is used by demand signal management system 200 for harmonization.

Approval for a proposed global record may be requested using global record approval request message 216. Global record approval request message 216 may comprise a proposed global record or multiple proposed global records. Global record approval request message 216 is forwarded to the appropriate approver, assuming demand signal management system 200 does not have the authority to approve the proposed record.

An approver may respond to a global record approval request message 216 with a global record approval response message 218. The global record approval response message 218 may include approval for the proposed record or some modification of the proposed global record. Modification also includes complete replacement with a different global record altogether.

In another example embodiment, some combination of UI system 206 and messages/services may be used. For example, some work may be assigned and completed via UI system 206 (accepting or rejecting data sets to harmonize, for example), while other work is assigned and completed by messages/services (distributing/receiving global records, for example). As another example, some types of work are accomplished using UI system 206 (accessing global records, for example), while other types of work are accomplished using messages/services (requesting approval of proposed records). In still another example, some partners use UI system 206 while other partners use messages/services. Thus, functions may be accomplished using UI system 206 and messages/services in any combination for any partner or collection of partners.

Figure 3:
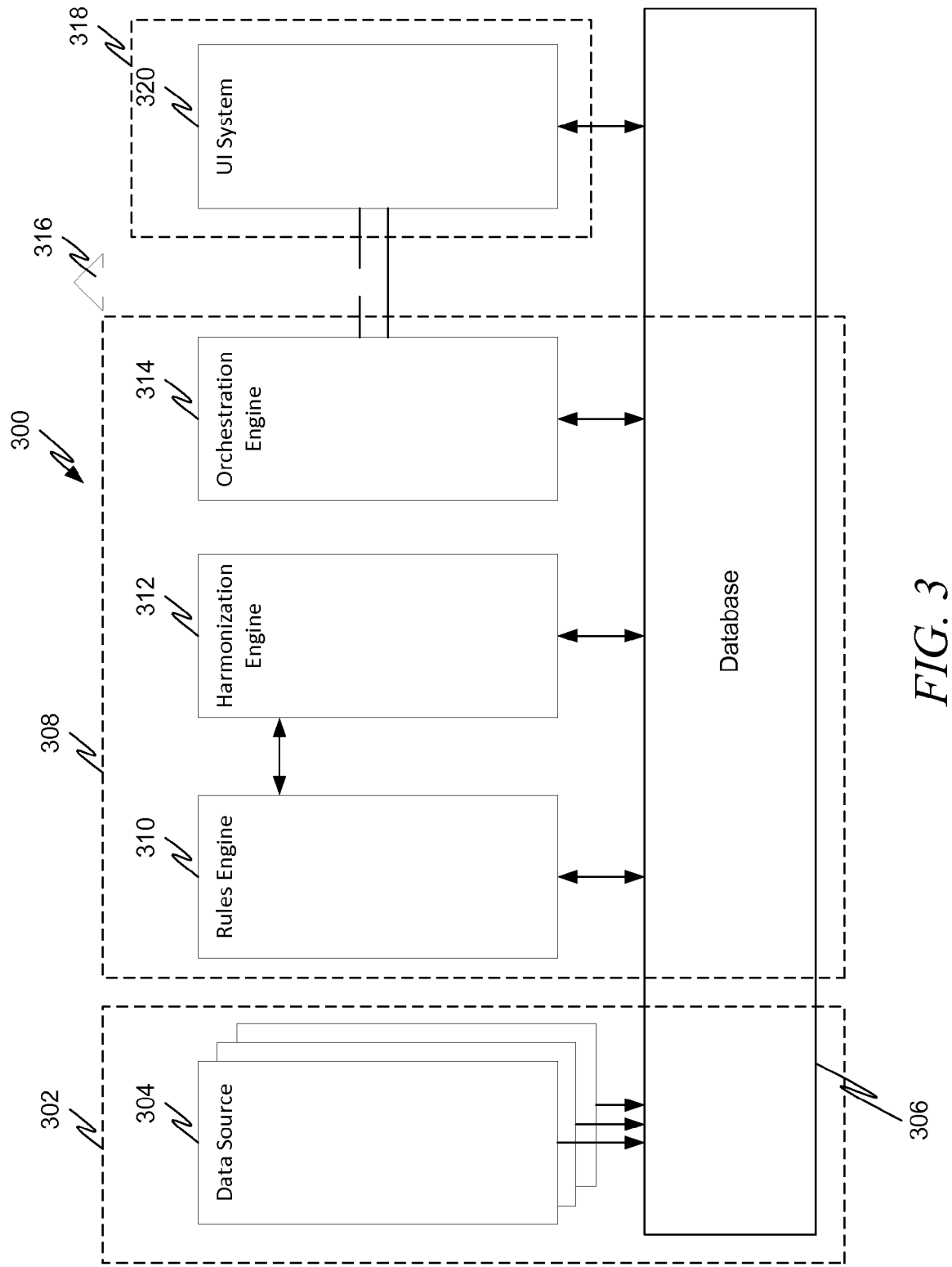
FIG. 3 illustrates an example embodiment of a system to coordinate partners for data harmonization.

FIG. 3 illustrates an example embodiment of a system to coordinate partners for data harmonization. The system shown generally as 300 is an example embodiment of a demand signal management system. Demand signal management system 300 may comprise a data collection and aggregation component 302. Data collection and aggregation component 302 represents collecting the desired data and, if necessary, aggregating data from multiple sources together. As previously discussed, such data may comprise point of sale (POS) data, sales orders, product demand, sales forecasts, competitor data, market research data, and/or other data. In some embodiments, the desired data may be collected by the demand signal management system 300. In some embodiments, the data may be collected for the demand signal management system 300 by another internal system. In other embodiments, the desire data may be collected by one or more entities and provided to the demand signal management system 300. In still other embodiments, a combination of internally collected data and externally collected data is used. The various data sources of data are illustrated by data sources 304.

As data is collected, it may be stored in a repository. In some embodiments, such a repository may be stored using database 306. Database 306 may be a conventional database, an in-memory database, or some combination thereof. By way of example only, a suitable in-memory database is discussed in conjunction with FIG. 8 and FIG. 9 below.

Demand signal management system 300 may comprise a harmonization component 308. In FIG. 3, harmonization component 308 comprises rules engine 310, harmonization engine 312 and orchestration engine 314.

Data may often be automatically harmonized. Automatic data harmonization may be implemented using rules that are applied to data. The rules to be applied may be specific to a particular type or source of data. Thus, depending on the number of data sources, the number of rules to be applied can be large. Rules typically take the form of a mapping that identifies how a particular format or data attribute should be handled. For example, data from one source may use one product ID. That product ID should be replaced with an internal product ID when it is encountered. A rule may comprise attribute value pairs that indicate an internal value that should replace an external value. Conditions may be associated with the attribute value pairs, so that the internal value only replaces the external value when the data is from a certain source or a format is converted in a particular way when a certain condition applies. Rules engine 310 may provide and maintain the rules used for harmonization.

Harmonization engine 312 may retrieve unharmonized data from the repository, apply rules from rules engine 310, and store the resultant harmonized data in either the same or a different repository. Harmonization engine 312 may also perform other functions such as categorization, profiling and clustering, if desired. Alternatively, or additionally, these functions may be performed elsewhere or not at all.

Harmonization engine 312 may also detect when automatic harmonization fails for some reason. A variety of reasons exist why certain data may not be automatically harmonized. In some situations, rules do not exist to apply to the data. In some situations, the harmonization engine cannot determine what rule to apply. In still other situations, a rule was applied, but for whatever reason, the result is not appropriate. In these situations, the harmonization engine may engage orchestration engine 314 to take appropriate action.

Orchestration engine 314 may operate according to policies (or rules) that determine what action should be taken under what situation. In some situations, orchestration engine 314 may be engaged to handle data the harmonization engine 312 is unable to handle. In some situations, orchestration engine may be engaged on data that had not been previously assessed by harmonization engine 312 (e.g., a data set that should be handled a different way than by harmonization engine 312). Orchestration engine 314 may take simple actions, such as sending notifications, or more complicated actions such as opening a detailed workflow and coordination among third parties to accomplish harmonization. Example workflows are discussed below and may use, for example, messages identified in FIG. 2. Orchestration engine 314 may utilize messages/services and/or a UI system, as previously discussed elsewhere. Messages/services are represented in FIG. 3 by communication path 316. UI system is represented by UI system 320.

Demand signal management system 300 may comprise or use UI system 320. UI system 320 may reside outside the firewall as illustrated by dashed line 318. UI system 318 may be used to allow partners to access the functionality of demand signal management system remotely, such as by remote procedure call. UI system 318 may be used by orchestration engine 314 to present workflow, etc. to the partner and to coordinate their participation in the harmonization process. Example workflows are discussed below.

Figure 4:
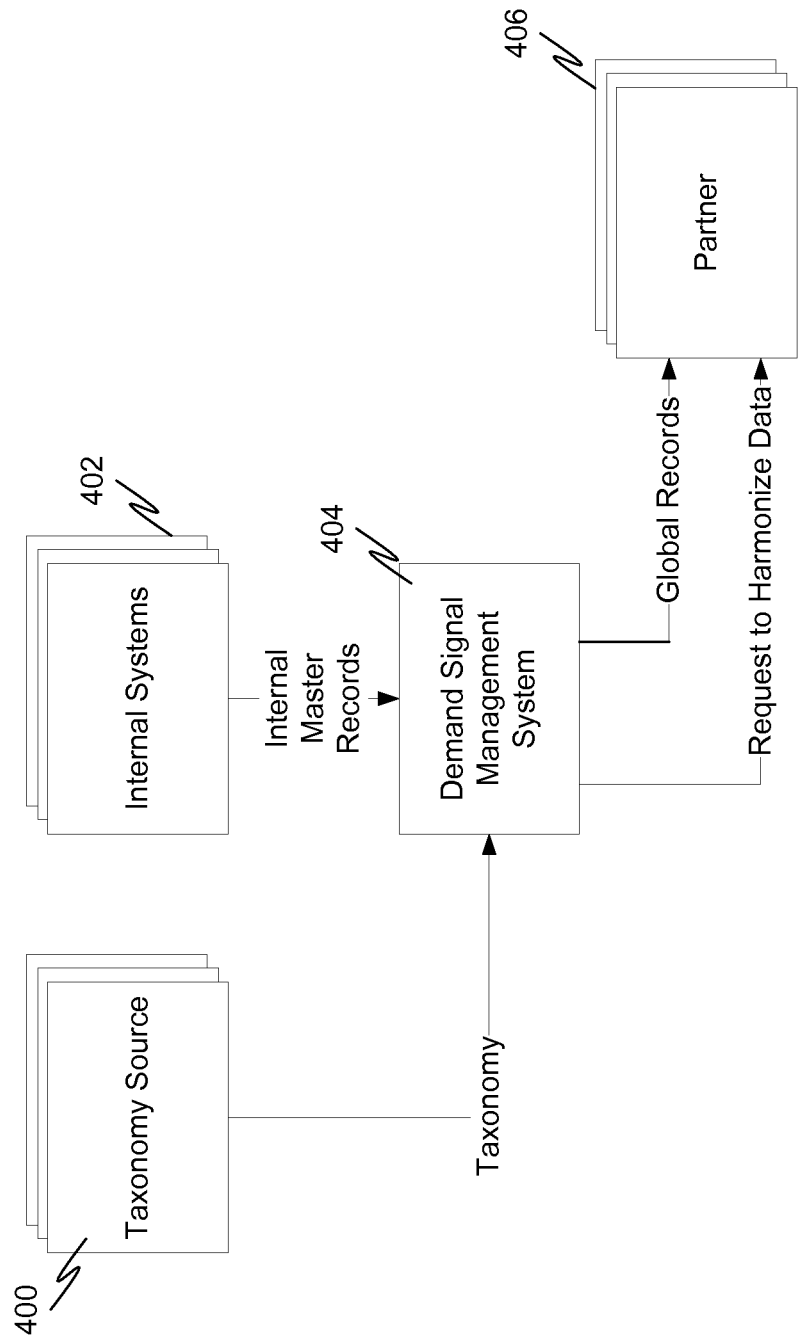
FIG. 4 illustrates an example embodiment to create and distribute global records.

FIG. 4 illustrates an example embodiment to create and distribute global records. Taxonomy source 400 represents the source or sources of taxonomy that will be used to create global records for harmonization. A taxonomy is a schema that represents the attributes of records, along with their values, that should be used in harmonization. An example taxonomy may include a company ID, product IDs associated with the company ID, quantity units associated with the product IDs, etc. The taxonomy may come from outside the company, such as being provided by a third party (or multiple third parties), or may come from inside the company, and/or a combination of both.

A taxonomy source is often the approver for proposed changes that relate to taxonomy. For example, if a proposed global record is received and the proposed global record relates to a taxonomy, the taxonomy source is often the approver for the proposed global record. Alternatively, or additionally, authority to approve proposals related to a taxonomy may be delegated from the taxonomy source to another entity.

Master records may be pulled from internal systems 402. These master records are records that should be used in deriving the global records for harmonization. Master records may include, for example, current distributors of a product, along with the products they sell, etc. A schema may also be associated with, or extracted from, master records.

Demand signal management system 404 combines the taxonomy and master records into global records that will be used to harmonize the data. Global records reflect both the taxonomy and the master records and represent a combined schema that should be used to harmonize the data. Due to the various sources that may be used to obtain the taxonomy and master records, various entities, both inside and outside, may have responsibility over changes in their respective taxonomies. As taxonomies or master records change, the global records may be changed to reflect the taxonomy/master records change. Similarly, if changes need to be made to the global records, such changes may be sent to the owner of the respective taxonomy and/or master record for approval and the change incorporated into the taxonomy/master record.

Demand signal management system 404 provides these global records to various partners 406. Providing the global records may comprise making the global records available via a system such as UI system 320 or UI system 206. Alternatively, or additionally, providing the global records may also comprise identifying the global records in a message, such as global records message 208. As previously discussed, in some embodiments, not all global records are provided to all partners. In such embodiments, demand signal management system 404 provides the global records a particular party will need to perform the harmonization.

Figure 5:
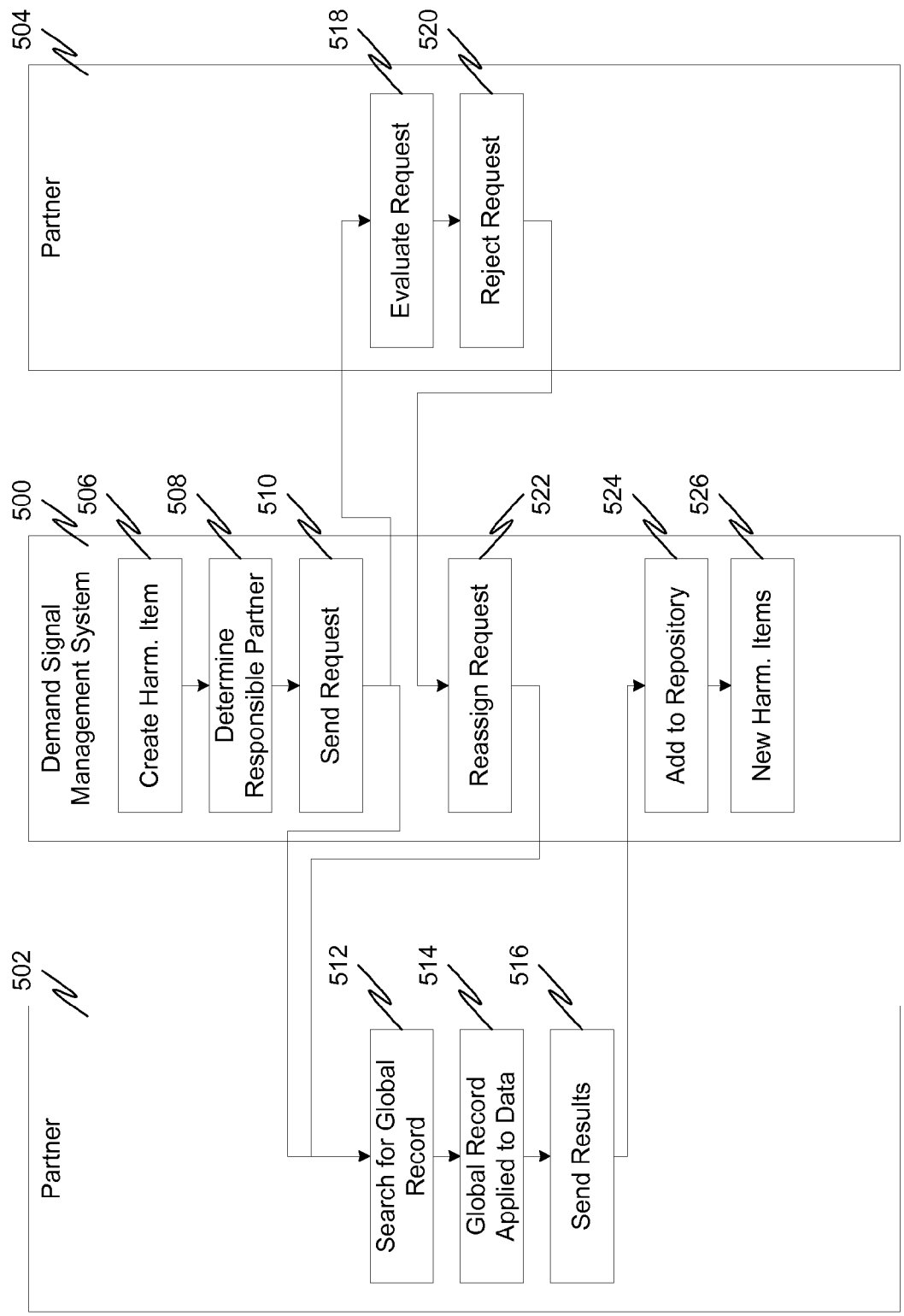
FIG. 5 illustrates an example embodiment to coordinate partners for data harmonization.

FIG. 5 illustrates an example embodiment to coordinate partners for data harmonization. In the example embodiment, demand signal management system 500 coordinates two partners, partner 502 and partner 504 to perform harmonization. Partners may be external entities engaged to help or perform harmonization tasks. The illustrated embodiment of FIG. 5, demonstrates an example process or workflow for assigning harmonization work, and having a partner either accept or reject the work. As the question of adding a new global record does not arise in the illustrated embodiment, the authority of partner 502 and partner 504 to create global records is not important.

The process begins at block 506 with demand signal management system 500 identifying data that should be harmonized and creating a work item or otherwise designating the work to be performed. This data may be an individual data item, or a set of data that should be harmonized.

As illustrated by block 508, demand signal management system 500 then identifies a suitable partner that should be assigned the harmonization work. This may be accomplished through policies or rules or any other mechanism.

In block 510, demand signal management system 500 then sends the request to the appropriate partner. This may be accomplished, for example, using a harmonization request message, such as harmonization request message 210 of FIG. 2. In the illustrated embodiment, demand signal management system 500 sends one request to partner 502 and a second request to partner 504.

Partner 502 receives the request and evaluates it. After deciding to accept the request, partner 502 searches for global records that should be applied when harmonizing the data received. Block 512 illustrates this process.

As the appropriate global record(s) exists, in block 514 partner 502 harmonizes the data. This is accomplished by applying the global record to the data, for example, by assigning internal attributes to external attributes as appropriate. The results of harmonization are returned to demand signal management system 500 in block 516 using, for example, harmonization request response message 214 of FIG. 2.

Partner 504 receives its request and evaluates it in block 518. In this case, partner 504 decides to reject the request. A rejection is returned in block 520 to demand signal management system 500 using, for example, reject harmonization request message 212 of FIG. 2.

Demand signal management system 500 receives the rejection and, in block 522, reassigns the request to partner 502. This may be accomplished, for example, using harmonization request message 210 of FIG. 2. Partner 502 processes the reassigned request like the prior request it received.

As demand signal management system 500 receives harmonization results, via, for example, harmonization request response message 214, the results are stored in a harmonization repository. Block 524 illustrates this process. Demand signal management system 500 then identifies and assigns additional harmonization work as indicated by block 526.

Although the example embodiment of FIG. 5 has been described using messages to communicate between demand signal management system 500 and partner 502 and 504, a UI system, such as UI system 206 or 320 may also be used.

Figure 6:
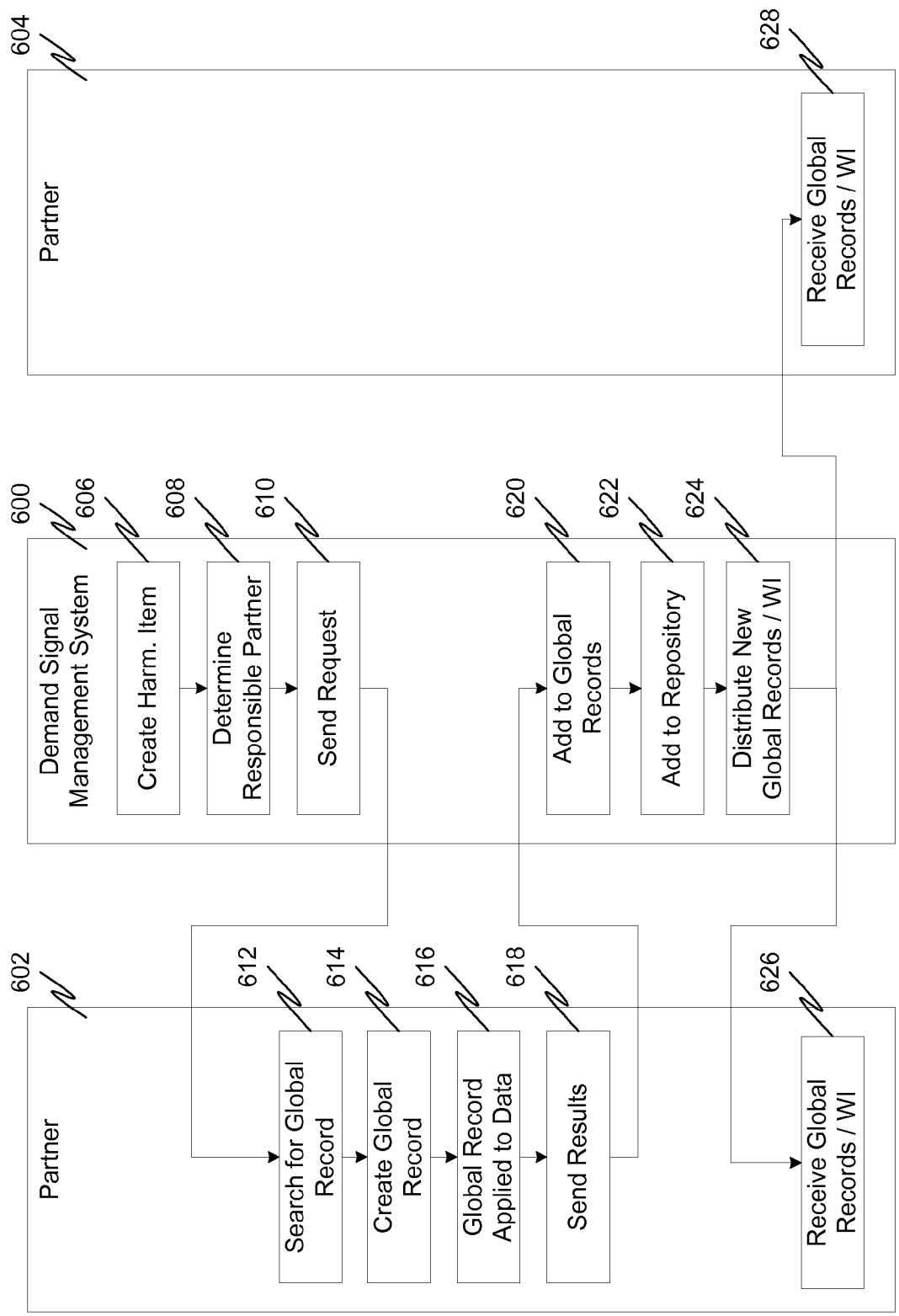
FIG. 6 illustrates an example embodiment to coordinate partners for data harmonization.

FIG. 6 illustrates an example embodiment to coordinate partners for data harmonization. In the example embodiment, demand signal management system 600 coordinates two partners, partner 602 and partner 604 to perform harmonization. The illustrated embodiment of FIG. 6, demonstrates an example process or workflow for assigning harmonization work and having a partner create a new global data record as part of the process. In this embodiment, partner 602 has authority to create new global records. Since partner 602 has the authority to create new global records, no approval needs to be obtained when the global records are created. A partner may the authority to create new global records in one part of the global records but not in another part. Thus, creation/approval authority is not a binary thing (e.g., either you have it or don't), but functions more like access privileges in a hierarchical database, where a partner may have authority to create records in one part of the database and not in another. Therefore, partner 602 may have creation/approval over one part of the global records but not another part of the global records.

The process begins at block 606 with demand signal management system 600 identifying data that should be harmonized and creating a work item or otherwise designating the work to be performed. This data may be an individual data item, or a set of data that should be harmonized.

As illustrated by block 608, demand signal management system 500 then identifies a suitable partner that should be assigned the harmonization work. This may be accomplished through policies or rules or any other mechanism.

In block 610, demand signal management system 600 then sends the request to partner 602. This may be accomplished, for example, using a harmonization request message, such as harmonization request message 210 of FIG. 2.

Partner 602 receives the request and evaluates it. After deciding to accept the request, partner 602 searches for global records that should be applied when harmonizing the data received. Block 612 illustrates this process.

In this case, an appropriate global record to harmonize the data was not found. As partner 602 has authority to create new global records, an appropriate new global record is created in block 614. The new global record is used in block 616 to harmonize the data. This is accomplished by applying the global record to the data, for example, by assigning internal attributes to external attributes as appropriate. The results of harmonization are returned to demand signal management system 600 in block 618 using, for example, harmonization request response message 214 of FIG. 2. In this situation, the new global record may be returned as part of the response.

As demand signal management system 600 receives harmonization results, via, for example, harmonization request response message 214 of FIG. 2. The new global record is added to the global records in block 620. In block 622 the harmonized data is added to the harmonization repository. Finally, in block 624 demand signal management system 600 distributes the new global records using, for example, global records message 208 of FIG. 2. Demand signal management system 600 may also identify and assign additional harmonization work. Partner 602 and partner 604 receive global records message with the new global records and any new work assignments (via harmonization request message 210 of FIG. 2) as indicated by block 626 and block 628, respectively.

Although the example embodiment of FIG. 6 has been described using messages to communicate between demand signal management system 600 and partner 602 and 604, a UI system, such as UI system 206 or 320 may also be used.

Figure 7:
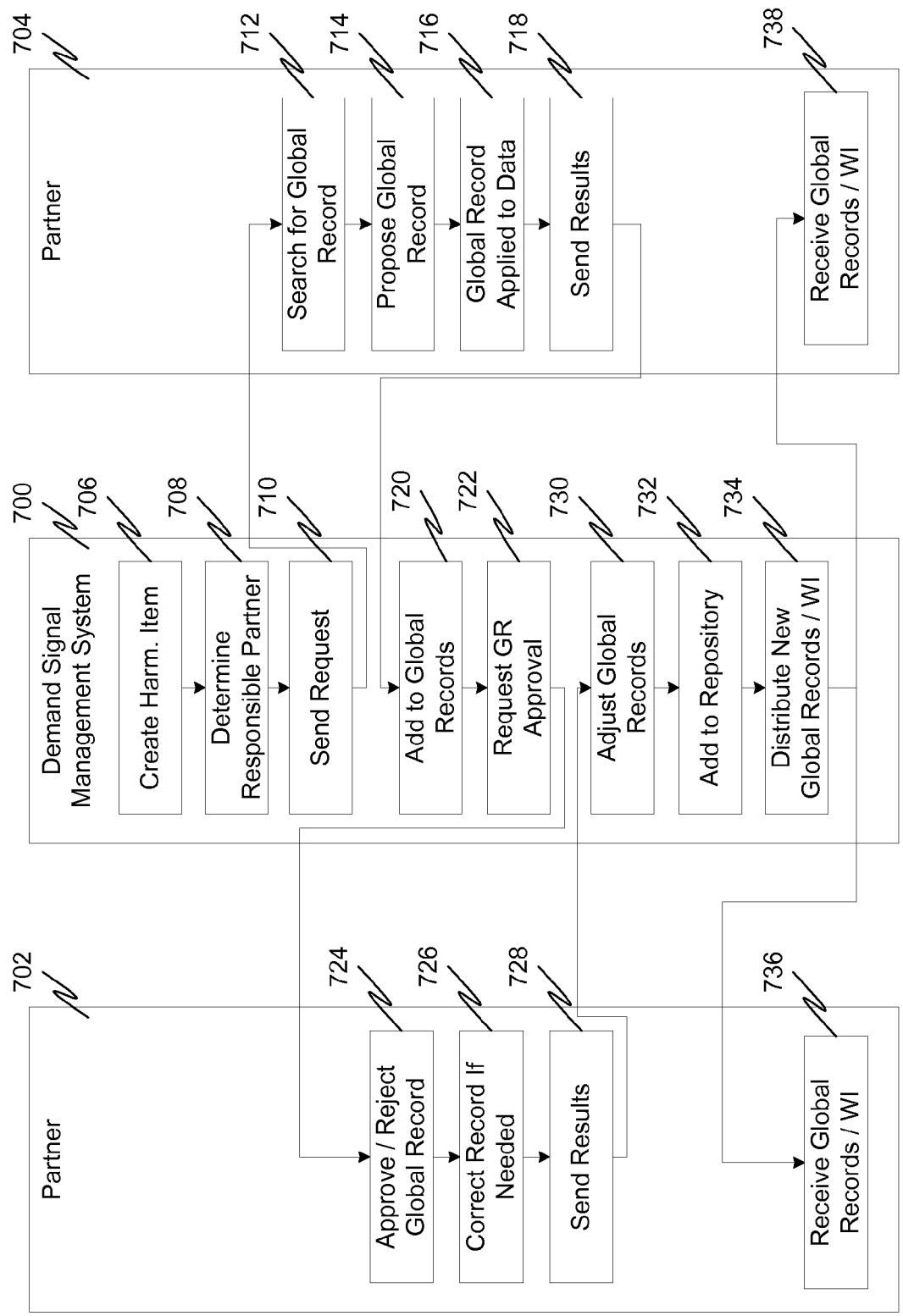
FIG. 7 illustrates an example embodiment to coordinate partners for data harmonization.

FIG. 7 illustrates an example embodiment to coordinate partners for data harmonization. In the example embodiment, demand signal management system 700 coordinates two partners, partner 702 and partner 704 to perform harmonization. The illustrated embodiment of FIG. 7, demonstrates an example process or workflow for assigning harmonization work and having a partner create a new proposed global data record as part of the process. The proposed global record is then approved. In this embodiment, partner 702 has authority to create new global records. This also implies that partner 702 has the authority to approve new global records. Partner 704 does not have the authority to approve global records. A partner may the authority to create new global records in one part of the global records but not in another part. Thus, approval authority is not a binary thing (e.g., either you have it or don't), but functions more like access privileges in a hierarchical database, where a partner may have authority to create records in one part of the database and not in another. Therefore, partner 702 may have approval over one part of the global records and partner 704 may have approval over a different part of the global records.

The process begins at block 706 with demand signal management system 700 identifying data that should be harmonized and creating a work item or otherwise designating the work to be performed. This data may be an individual data item, or a set of data that should be harmonized.

As illustrated by block 708, demand signal management system 500 then identifies a suitable partner that should be assigned the harmonization work. This may be accomplished through policies or rules or any other mechanism.

In block 710, demand signal management system 700 then sends the request to partner 604. This may be accomplished, for example, using a harmonization request message, such as harmonization request message 210 of FIG. 2.

Partner 704 receives the request and evaluates it. After deciding to accept the request, partner 704 searches for global records that should be applied when harmonizing the data received. Block 712 illustrates this process.

In this case, an appropriate global record to harmonize the data was not found. As partner 704 does not have authority to create new global records, an appropriate new global record is created in block 614 as a proposed global record. The proposed global record is used in block 716 to harmonize the data. This is accomplished by applying the global record to the data, for example, by assigning internal attributes to external attributes as appropriate. The results of harmonization are returned to demand signal management system 700 in block 718 using, for example, harmonization request response message 214 of FIG. 2. In this situation, the proposed global record may be returned as part of the response.

As demand signal management system 700 receives harmonization results, via, for example, harmonization request response message 214 of FIG. 2. it identifies that a proposed global record has been returned. The proposed global record is added to the global records in block 720. Assuming demand signal management system 700 does not have the authority to approve the proposed global record, in block 722 the proposed global record is sent to an approver, in this case partner 702. The proposed global record may be sent, for example, using global record approval request message 216 of FIG. 2.

Partner 702 receives the proposed global record and in block 724, approves or rejects it. If partner 702 approves the global record, notice may be sent directly back to demand signal management system 700 in block 728. However, if partner 702 rejects the proposed global record, then partner 702 corrects the proposed global record in block 726 and sends the corrected global record to demand signal management system 700 in block 728. Notice of acceptance or corrected global record may be sent to demand signal management system 700 using global record approval response 218 of FIG. 2. If a taxonomy should be updated due to the creation and/or correction of the proposed global record, the taxonomy may also be sent to signal management system 700, either as part of the same message or in a different message or by a different channel.

Upon receipt of the global record approval response message, demand signal management system 700 makes any corrections to the proposed global record in block 730. The harmonized data is added to the harmonization repository in block 732. Finally, in block 734 demand signal management system 700 distributes the new global records using, for example, global records message 208 of FIG. 2. Demand signal management system 700 may also identify and assign additional harmonization work. Partner 702 and partner 704 receive global records message with the new global records and any new work assignments (via harmonization request message 210 of FIG. 2) as indicated by block 736 and block 738, respectively.

Although the example embodiment of FIG. 7 has been described using messages to communicate between demand signal management system 700 and partner 702 and 702, a UI system, such as UI system 206 or 320 may also be used.

Figure 8:
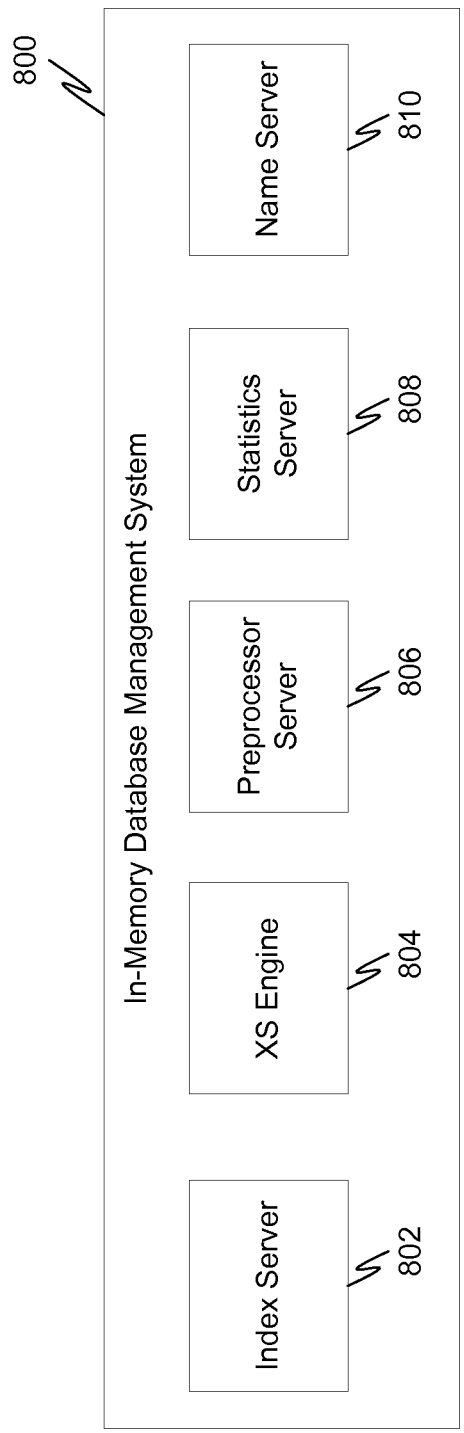
FIG. 8 illustrates an example embodiment of an in-memory repository.

In some embodiments, the system may use an in-memory database management system. FIG. 8 illustrates an example embodiment of an in-memory repository. An in-memory database is a database management system that primarily relies on main memory for computer data storage. It is contrasted with database management systems that employ a disk storage mechanism. One example of an in-memory database is the HANA system from SAP AG of Walldorf, Germany.

Here, an in-memory database system 800 includes an index server 802, an eXternal Subroutine (XS) Engine 804, a preprocessor server 806, a statistics server 808, and a name server 810. These components may operate on a single computing device, or may be spread among multiple computing devices (e.g., separate servers).

In an example embodiment, the index server 802 contains the actual data and the engines for processing the data. It also coordinates and uses all the other servers. In an example embodiment, a (or more than one) specialized database may maintained in the index server 802 to store information relevant to global records, data harmonization, workflow, etc. The name server 810 holds information about the database topology. This is used in a distributed system with instances of the database on different hosts. The name server 810 knows where the components are running and which data is located on which server.

The statistics server 808 collects information about status, performance, and resource consumption from all the other server components. The preprocessor server 806 is used for analyzing text data and extracting the information on which the text search capabilities are based. The XS engine 804 allows clients to connect to the database system 800 using Hypertext Transfer Protocol (HTTP).

Figure 9:
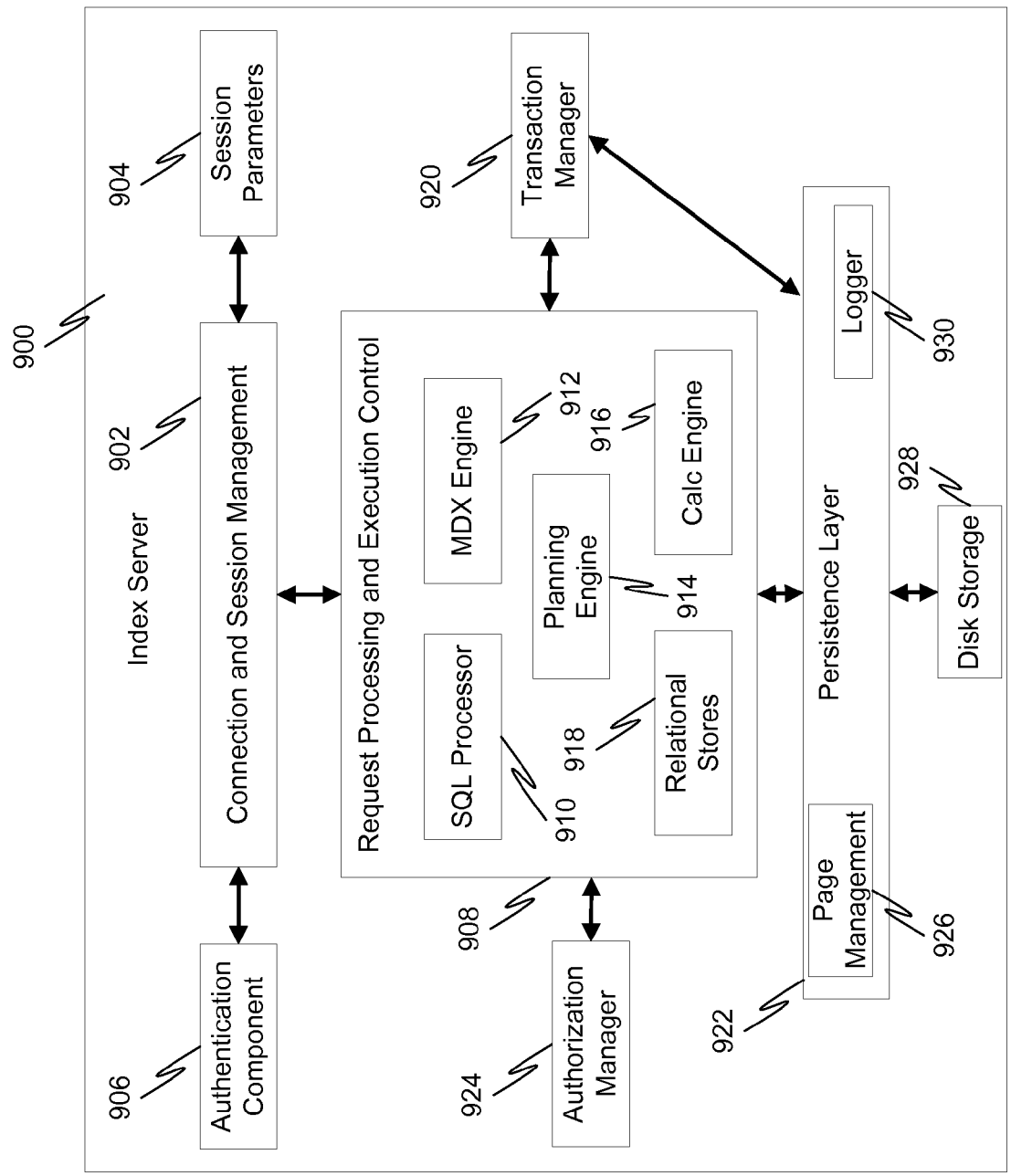
FIG. 9 illustrates an example embodiment of an index server in an example in-memory repository.

FIG. 9 illustrates an example embodiment of an index server in an example in-memory repository. The index server may, in some embodiments, be utilized as the index server 802 in the system of FIG. 8. The index server 900 includes a connection and session management component 902, which is responsible for creating and managing sessions and connections for the database clients. Once a session is established, clients can communicate with the database system (e.g., database system 800 of FIG. 8) using SQL statements. For each session, a set of session parameters 904 may be maintained, such as auto-commit, current transaction isolation level, and the like. Users (and/or other database clients) are authenticated either by the database system itself (e.g., login with user name and password, using authentication component 906), or authentication can be delegated to an external authentication provider such as a Lightweight Directory Access Protocol (LDAP) directory.

The client requests can be analyzed and executed by a set of components summarized as request processing and execution control 908. The SQL processor 910 checks the syntax and semantics of the client SQL statements and generates a logical execution plan. Multidimensional expressions (MDX) is a language for querying and manipulating multidimensional data stored in Online Analytical Processing (OLAP) cubes. As such, an MDX engine 912 is provided to allow for the parsing and executing of MDX commands. A planning engine 914 allows financial planning applications to execute basic planning operations in the database layer. One such operation is to create a new version of a dataset as a copy of an existing dataset, while applying filters and transformations.

A calc engine 916 implements the various SQL scripts and planning operations. The calc engine 916 creates a logical execution plan for calculation models derived from SQL script, MDX, planning, and domain-specific models. This logical execution plan may include, for example, breaking up a model into operations that can be processed in parallel.

The data is stored in relational stores 918, which implement a relational database in main memory.

Each SQL statement may be processed in the context of a transaction. New sessions are implicitly assigned to a new transaction. The transaction manager 920 coordinates database transactions, controls transactional isolation, and keeps track of running and closed transactions. When a transaction is committed or rolled back, the transaction manager 920 informs the involved engines about this event so they can execute actions. The transaction manager 920 also cooperates with a persistence layer 922 to achieve atomic and durable transactions.

An authorization manager 924 is invoked by other database system components to check whether the user has the privileges to execute the requested operations. The database system allows for the granting of privileges to users or roles. A privilege grants the right to perform a specified operation on a specified object.

The persistence layer 922 ensures that the database is restored to the most recent committed state after a restart and that transactions are either completely executed or completely undone. To achieve this goal in an efficient way, the persistence layer 922 uses a combination of write-ahead logs, shadow paging, and save points. The persistence layer 922 also offers a page management interface 926 for writing and reading data to a separate disk storage 928, and also contains a logger 930 that manages the transaction log. Log entries can be written implicitly by the persistence layer 922 when data is written via the persistence interface or explicitly by using a log interface.

Figure 10:
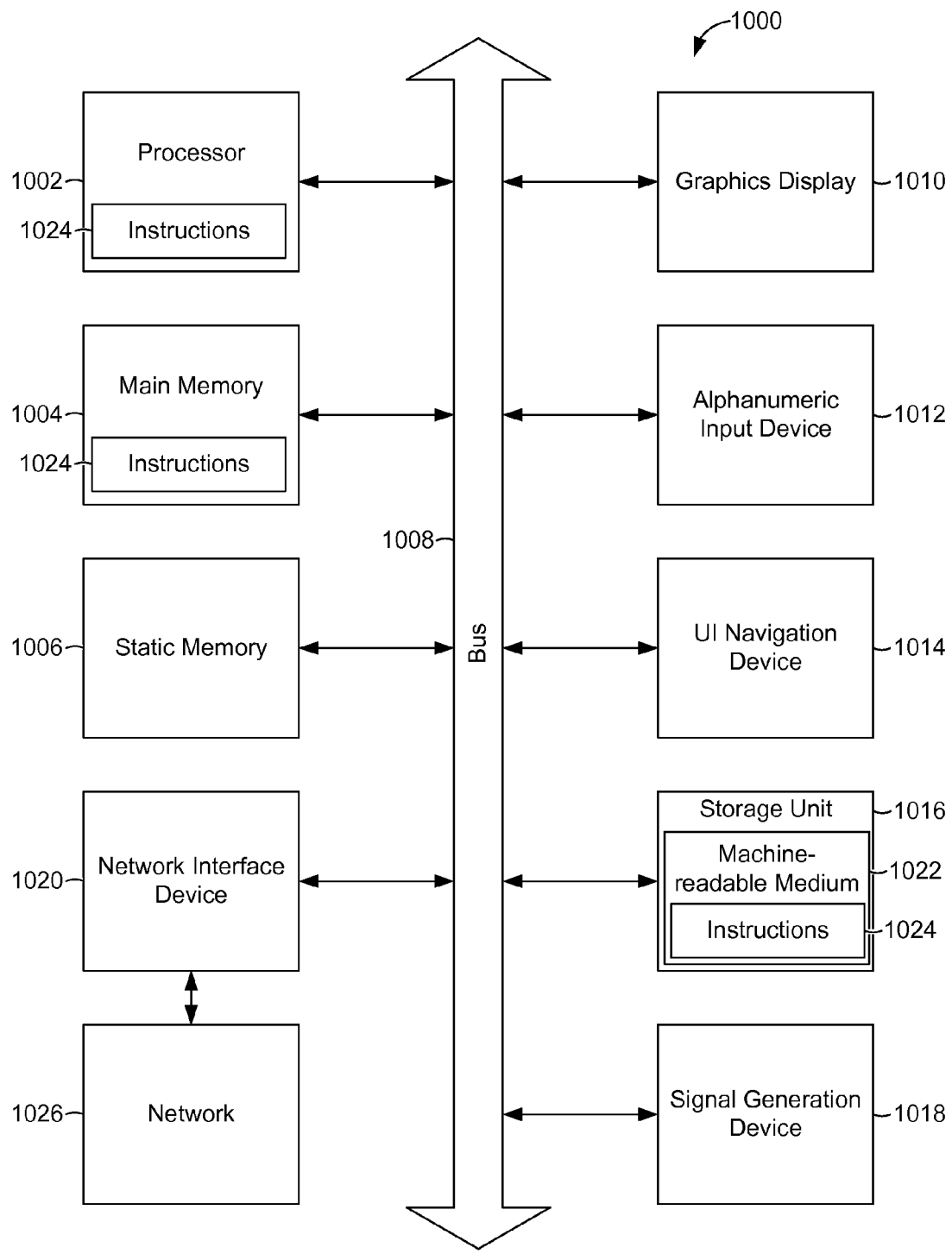
FIG. 10 illustrates a block diagram of a computer processing system, within which a set of instructions for causing the computer to perform any one or more of the methodologies discussed herein may be executed.

FIG. 10 illustrates a block diagram of a computer processing system, within which a set of instructions for causing the computer to perform any one or more of the methodologies discussed herein may be executed.

Embodiments may also, for example, be deployed by Software-as-a-Service (SaaS), Application Service Provider (ASP), or utility computing providers, in addition to being sold or licensed via traditional channels. The computer may be a server computer, a personal computer (PC), a tablet PC, a set-top box (STB), a personal digital assistant (PDA), cellular telephone, or any processing device capable of executing a set of instructions (sequential or otherwise) that specify actions to be taken by that device. Further, while only a single computer is illustrated, the term "computer" shall also be taken to include any collection of computers that individually or jointly execute a set (or multiple sets) of instructions to perform any one or more of the methodologies discussed herein.

The example computer processing system 1000 includes processor 1002 (e.g., a central processing unit (CPU), a graphics processing unit (GPU), advanced processing unit (APU) or some combination thereof), main memory 1004 and static memory 1006, which communicate with each other via bus 1008. The processing system 1000 may further include graphics display 1010 (e.g., a plasma display, a liquid crystal display (LCD) or a cathode ray tube (CRT) or other display). The processing system 1000 also includes alphanumeric input device 1012 (e.g., a keyboard), a user interface (UI) navigation device 1014 (e.g., a mouse, touch screen, or the like), a storage unit 1016, a signal generation device 1018 (e.g., a speaker), and a network interface device 1020.

The storage unit 1016 includes machine-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004 and/or within the processor 1002 during execution thereof by the processing system 1000, with the main memory 1004 and the processor 1002 also constituting computer-readable, tangible media.

The instructions 1024 may further be transmitted or received over network 1026 via a network interface device 1020 utilizing any one of a number of well-known transfer protocols (e.g., HTTP).

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions 1024. The term "machine-readable medium" shall also be taken to include any medium that is capable of storing, encoding or carrying a set of instructions for execution by the computer and that cause the computer to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, and optical and magnetic media.

While various implementations and exploitations are described, it will be understood that these embodiments are illustrative and that the scope of the claims is not limited to them. In general, techniques for maintaining consistency between data structures may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims.

While the embodiments are described with reference to various implementations and exploitations, it will be understood that these embodiments are illustrative, and that the scope of claims provided below is not limited to the embodiments described herein. In general, the techniques described herein may be implemented with facilities consistent with any hardware system or hardware systems defined herein. Many variations, modifications, additions, and improvements are possible.

The term "computer readable medium" is used generally to refer to media embodied as non-transitory subject matter, such as main memory, secondary memory, removable storage, hard disks, flash memory, disk drive memory, CD-ROM and other forms of persistent memory. It should be noted that program storage devices, as may be used to describe storage devices containing executable computer code for operating various methods, shall not be construed to cover transitory subject matter, such as carrier waves or signals. "Program storage devices" and "computer-readable medium" are terms used generally to refer to media such as main memory, secondary memory, removable storage disks, hard disk drives, and other tangible storage devices or components.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims and their equivalents.

What is claimed is:

1. A method comprising:
   accessing a taxonomy and a set of master records;
   deriving a set of global records from the taxonomy and master records, the set of global records reflecting a combined schema including supported field values;
   providing the set of global records related to a product to a third party via a demand signal management system;
   collecting unharmonized data regarding the product;
   identifying unharmonized data to the third party via the demand signal management system; and
   receiving, at the demand signal management system from the third party, either a rejection or harmonized data, wherein the harmonized data is a version of the unharmonized data that has been harmonized as a function of the provided global data and wherein the rejection indicates that the third party will not harmonize the data.

2. The method of claim 1, wherein providing the set of global records comprises sending a message via the demand signal management system to the third party, the message comprising the set of global records.

3. The method of claim 1, wherein when the rejection is received, the method further comprises, identifying to a second third party via the demand signal management system, the unharmonized data.

4. The method of claim 1, wherein the harmonized data comprises a proposed change to the set of global records.

5. The method of claim 4, further comprising:
   sending, via the demand signal management system, a request to approve the proposed change to the set of global records.

6. The method of claim 5, further comprising:
   receiving, in response to the request to approve the proposed change to the set of global records, either an approval or a corrected version of the proposed change to the set of global records.

7. The method of claim 6, wherein when the corrected version of the proposed change to the set of global records is received, the method further comprises receiving a change to the taxonomy.

8. The method of claim 1, wherein identifying the unharmonized data comprises sending a message comprising unharmonized data from the demand signal management system to the third party.

9. A system comprising:
   a computer processor and a computer storage device configured to perform operations comprising:
     send a global records message to a third party, the global records message comprising a global record having a plurality of attributes;
     obtain unharmonized data;
     send a harmonization request message identifying the unharmonized data to the third party; and
     receiving a harmonization response comprising a record selected from the group comprising an update based on the global record, a new global record, a proposed new global record and a rejection.

10. The system of claim 9, wherein the unharmonized data is received from a an external entity and the harmonization request message comprises the unharmonized data.

11. The system of claim 9, wherein when the harmonization response comprises the proposed new global record, the system is configured to send a global record approval request to an approver, the global record approval request comprising the proposed new global record.

12. The system of claim 11, wherein the system is configured to receive a global record approval response comprising a corrected version of the proposed new global record.

13. The system of claim 12, wherein the global record approval response further comprises a change to a taxonomy.

14. A machine-readable storage medium comprising instructions that, when executed by at least one processor of a machine, configure the machine to perform operations comprising:
- accessing a taxonomy and a set of master records;
- deriving a set of global records from the taxonomy and master records, the set of global records reflecting a combined schema including supported field values;
- send a global records message, the global records message comprising the set of global records;
- obtain unharmonized data;
- send, to a first recipient, a harmonization request message identifying the unharmonized data and requesting harmonization of the unharmonized data; and
- receive, from the first recipient, a message selected from the group comprising a harmonization response message and a reject harmonization request message, the harmonization response comprising a record selected from the group comprising an update based on the global record, a new global record, or a proposed new global record; and
- the harmonization reject message signaling rejection of the harmonization request.

15. The machine-readable storage medium of claim 14, wherein when the message is the harmonization reject message, and in response to receiving the harmonization reject message, the instructions further configure the machine to send, to a second recipient, a second harmonization request message comprising the unharmonized data and requesting harmonization of the unharmonized data.

16. The machine-readable storage medium of claim 14, wherein upon receiving the proposed new global record the instructions further configure the machine to request approval of the proposed new global record and, upon receiving approval, sending a second global records message comprising the proposed new global record.

17. The machine-readable storage medium of claim 16, wherein requesting approval of the proposed new global record comprises sending a global record approval request message and wherein receiving approval comprises receiving a global record approval response message.

18. The machine-readable storage medium of claim 17, wherein the global records approval response message comprises either approval of the proposed new global record or a corrected version of the proposed new global record.

19. The machine-readable storage medium of claim 18, wherein the second global records message comprises the corrected version of the proposed new global record rather than the proposed new global record.

* * * * *